May 19, 1970 — M. L. KULMAN — 3,512,591

CONTROL FOR TORQUE PRODUCING TOOL

Filed Sept. 5, 1968

United States Patent Office 3,512,591
Patented May 19, 1970

3,512,591
CONTROL FOR TORQUE PRODUCING TOOL
Melvin L. Kulman, deceased, late of Sayre, Pa., by Dorothy E. Kulman, administratrix, Sayre, Pa., assignor to Ingersoll-Rand Company, New York, N.Y., a corporation of New Jersey
Filed Sept. 5, 1968, Ser. No. 772,058
Int. Cl. B23d 5/06; E21c 5/16; E01c 21/12
U.S. Cl. 173—12
4 Claims

ABSTRACT OF THE DISCLOSURE

Control device for a fluid-operated rotary torque producing tool including two valves movable when the tool is applied to the work to permit pressure fluid to operate the motor of the tool. When a predetermined torque is reached, the torque sensing means of the tool causes one valve to stop the motor although the tool is still applied to the work.

This invention relates in general to motor driven torque producing tools but more in particular to a control device for the supply and shut-off of power to such a tool.

It is an object of this invention to produce a tool having a novel and improved control device to automatically start operation of the tool when applied to the work.

Another object of this invention is to produce a tool having a novel and improved control device to automatically stop operation of the tool when the torque resistance of the work reaches a predetermined value.

Still another object of this invention is to produce a tool having a novel and improved control device to automatically stop operation of the tool when the torque resistance of the work reaches a predetermined value and the tool is maintained applied to the work after such torque resistance is reached.

Yet another object of this invention is to produce a tool having a novel and improved control device which is simple in structure, efficient, and dependable to automatically stop operation of the tool when the torque resistance of the work reaches a predetermined value, and independent of the position of the tool after such predetermined torque resistance is reached whether the tool is maintained applied to the work or entirely disengaged therefrom.

In brief, these objects are achieved by providing a novel and improved control device for a pressure fluid operated torque producing tool comprising a motor, a normally closed first valve for the supply and shut-off of pressure fluid to the motor, and a normally closed second valve movable with the first valve for the supply and shut-off of pressure fluid to the motor. A torque sensing means connected to the motor to be driven thereby, and a spindle connected to the torque sensing means to be rotated thereby and movable with the torque sensing means. Means to transmit motion from the torque sensing means to each of the valves to open both valves when the spindle is moved in one direction, and to close the valves when the spindle and means for transmitting motion is moved in the opposite direction, and means responsive to a predetermined torque on the spindle to cause one of the valves to shut off the flow of pressure fluid to the motor immediately after reaching a predetermined torque and prior to movement of the spindle and means for transmitting motion in the opposite direction.

The invention is described hereinafter in connection with the accompanying drawings wherein.

Figure 1:
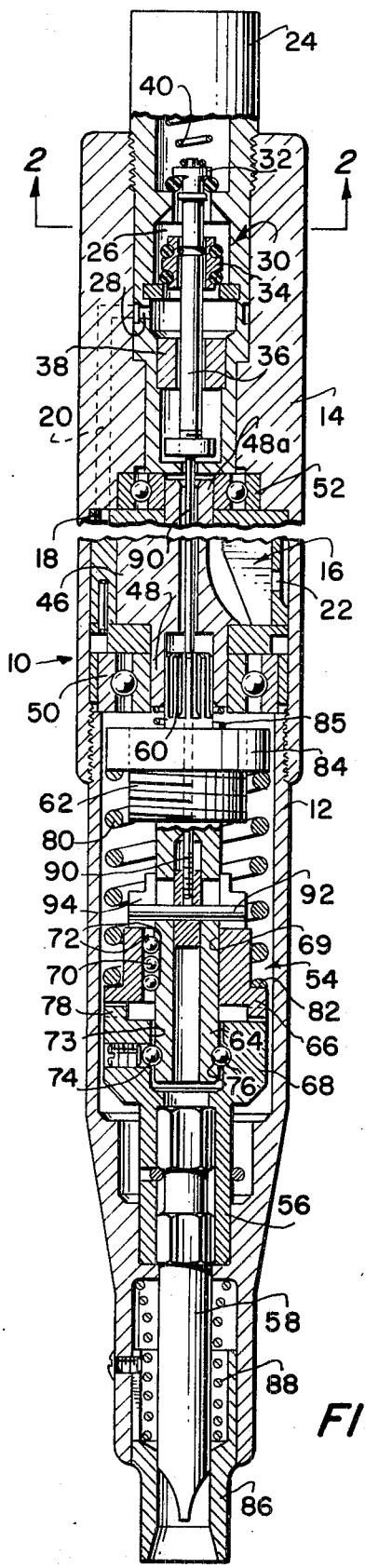
FIG. 1 is a side elevational view in section, with a portion broken away, of a torque producing tool embodying the invention.
Figure 2:
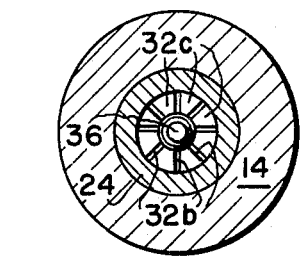
FIG. 2 is a cross-sectional view taken along line 2—2 in FIG. 1.

Referring to the drawings, and in particular FIG. 1, 10 designates the tool in which the invention is applied. The tool 10 comprises a housing 12 having a rear end portion 14 within which is mounted a commonly known type pressure fluid actuated motor 16, partly shown, having an inlet port 18 in communication with an inlet passage 20 through which pressure fluid is conducted to operate the motor. Spent pressure fluid is discharged through ports 22, only one shown, and to the atmosphere in a commonly known manner. The pressure fluid to operate the motor is supplied through a nipple 24 threaded into the backhead of the tool to which a flexible hose, not shown, may be connected for the conductance of the pressure fluid from a suitable source of supply, not shown. Pressure fluid flowing through nipple 24 is received in a valve chamber 26 formed within the backhead of the tool from where it is conducted through a port 28 in the downstream end portion of the valve chamber and into the inlet passage 20 in communication therewith and with inlet port 18 of the motor.

The flow of pressure fluid through valve chamber 26 and to the motor is controlled, according to the invention, by a novel and improved control device in the form of a valving arrangement 30 operating in response to a predetermined torque produced by the tool. Valving arrangement 30 is disposed within valve chamber 26 and comprises two valves 32 and 34 mounted in axially spaced relationship to each other on a common valve stem 36 extending slidably forwardly through a sealing bushing 38 forming the downstream end wall of valve chamber 26. Valve 32 is rigidly mounted on the rear end of valve stem 36. Valve 34, axially spaced from valve 32, is slidably mounted on valve stem 36, but yieldably held thereon by a detent arrangement in the form of a groove 42 in the valve stem 36 and balls 44 yieldably held in groove 42 by a rubber O ring 45. The purpose of this detent arrangement for valve 34 is to provide for valve 34 to be released and movable relative to valve stem 36 and valve 32, a structural feature which will be explained hereinafter in relation with the operation of the torque sensing means of the tool.

The seats for valves 32 and 34 are formed by shoulders 32a and 34a, respectively, within valve chamber 26. The forward face of shoulder 32a is formed by lands 32b defining forwardly diverging grooves 32c in the forward portion of shoulders 32a. Valve 34 is positioned downstream of valve 32, and normally, both valves are movable to seat and unseat simultaneously to, respectively, prevent or allow flow of pressure fluid from the upstream end portion to the downstream end portion of valve chamber 26 and into inlet port 18 and inlet passage 20. Valve stem 36 and both valves mounted thereon are constantly urged forwardly by a spring 40 bearing against the upper end of valve 32 and disposed in the upstream end portion of valve chamber 26.

Motor 16 includes a rotor 46 mounted on shafts 48 and 48a journalled within suitable bearings 50 and 52, respectively. Shaft 48 extends forwardly and is adapted to slidably drive a torque sensing means 54 and a chuck 56 to which a working implement 58 is releasably attached. The forward end portion of shaft 48 is hollow and is interiorly provided with splines and grooves to form a slidable driving connection with a stub shaft 60 having exterior splines and grooves corresponding to those interiorly of shaft 48, stub shaft 60 being mounted on the rear end of a threaded member 62 of the torque sensing means 54. Threaded member 62 is rigidly attached to a shaft 64 extending forwardly into driving relationship with the torque sensing means 54 comprising a pair of axially opposing and aligned clutch member 66 and 68. Shaft 64 extends through a bore 69 provided in clutch member 66 and is slidably interlocked therewith by balls 70 positioned in corresponding grooves 72 formed in shaft 64 and clutch member 66. Shaft 64 extends further into a bore 73 provided in clutch member 68 in axial alignment with bore 69 of clutch member 66, and is rotatably supported therein by balls 74 positioned in corresponding grooves 76 in shaft 64 and clutch member 68.

Rotary motion is transmitted from clutch member 66 to clutch member 68 by means of teeth 78 provided on the opposing faces of the clutch members 66, 68 in meshing engagement with each other, teeth 78 being adapted for camming action between the clutch members when one clutch member is rotated while the other clutch member is prevented from rotating. In order to constantly urge the teeth of the clutch members into a yieldable meshing engagement with each other, a relatively heavy coil spring 80 is provided to bear against a shoulder 82 formed on clutch member 66, and a nut 84 axially spaced from shoulder 82 and adjustably screwed onto threaded member 62. Axial adjustability of nut 84 is provided to adjust the compression rate of coil spring 80 in order to predetermine the torque load on the working implement, chuck, and clutch member 68 to cause camming of clutch member 66 rearwardly against the force of spring 80.

The rear ends of threaded member 62 and nut 84 are axially spaced from the forward end of shaft 48 and bearing 52, and a spring 85 is positioned between the forward end of shaft 48 and the rear end of threaded member 62 to constantly urge the torque sensing means 54 forwardly while permitting reciprocatory movement thereof.

The chuck 56 is connected to the forward end of clutch member 68 and rotatable therewith, and is adapted to releasably hold a working implement 58, such as a screwdriver, in a commonly known manner. The interior of the forward end portion of the housing 12 is adapted to accommodate an axially slidable guide 86 for the forward end of the working implement 58. Guide 86 is constantly urged forwardly by a spring 88 to extend forwardly of the working implement, the forward end of the guide being shaped to fit over the workpiece, not shown.

In order to coordinate the control of the flow of pressure fluid to operate the motor with the torque load on the torque sensing means 54, a rod 90 is provided to transmit axial movement from the torque sensing means 54 to the valving arrangement 30. Rod 90 extends axially slidably through the motor shafts 48a and 48, stub shaft 60, threaded member 62, and rear end portion of shaft 64. One end of rod 90 abuts against the forward end of valve stem 36 while the other end is supported by a crossbar 92 positioned in a slot 94 formed in the rear end portions of clutch member 66 and shaft 64. With this arrangement, axial movement of the torque sensing means 54 is transmitted to the valves 32 and 34 to control the operation of motor 16, as will be explained in detail hereinafter.

Figure 3:
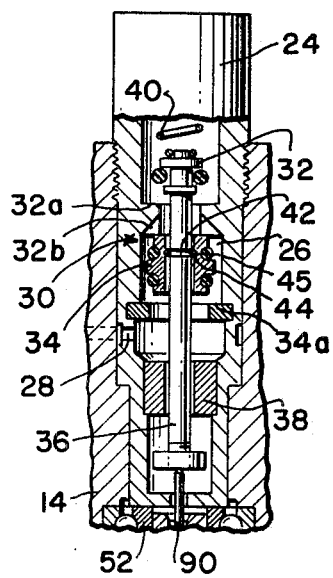
FIGS. 3, 4 and 5 are fragmental, longitudinal sectional views of the control device of the torque producing tool in different operational positions.

To start operation of the tool, the operator applies the tool to the work by exerting axial pressure on the tool to engage the work, such as a screw, not shown. Axial pressure against the work causes the guide 86 to move inwardly against spring 88, and after engagement of the working implement with the screw, not shown, continued axial pressure causes the working implement 58, chuck 56, and torque sensing means 54 to move rearwardly against spring 85. Rearward movement of torque sensing means 54 actuates crossbar 92 causing rod 90 to move rearwardly to move valve stem 36, and thereby actuating valves 32 and 34 against the force of spring 40 into an open position, as shown in FIG. 3. Pressure fluid is thus permitted to flow past both valves 32 and 34 and into port 28, through inlet passage 20, and motor inlet port 18 to operate motor 16. Rotary motion of motor 16 is transmitted through stub shaft 60 and torque sensing means 54 to the working implement 58 to tighten the screw, not shown. It is to be noted that when operation of the tool is started and both valves 32 and 34 are open, the position of valve 34 is such that the rear end thereof is in abutment with the lands 32b positioned at the forward end of shoulder 32a.

Figure 4:
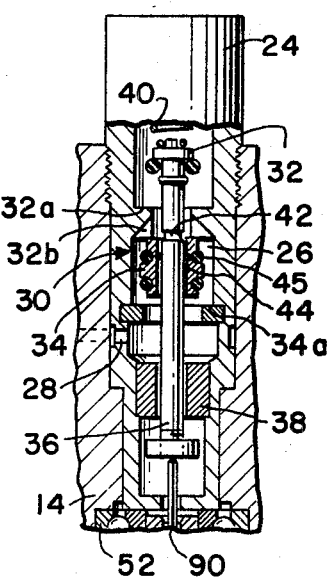

Screwing resistance is gradually increased until the screw, not shown, is fully tightened and the screw, working implement, and clutch member 68 are prevented from further rotation. Since motor 16 is still operative, clutch member 66 continues rotating causing the teeth thereof to be cammed rearwardly against the force of spring 80 by the teeth of clutch member 68. This camming action causes the crossbar 92 and rod 90 supported thereby to move rearwardly to force valve stem 36 an additional distance relative to the distance moved at starting operation of the tool. Since valve stem 36 is moved rearwardly an additional distance as a result of rearward camming of clutch member 66, the force exerted on valve stem 36 causes the detent arrangement on valve 34 and valve stem 36 to yield, i.e., the balls 44 are forced out of their groove 42 to permit valve stem 36 and valve 32 rigidly attached thereto to move additionally, rearwardly while valve 34 remains in abutment with the lands 32b, see FIG. 4.

Figure 5:
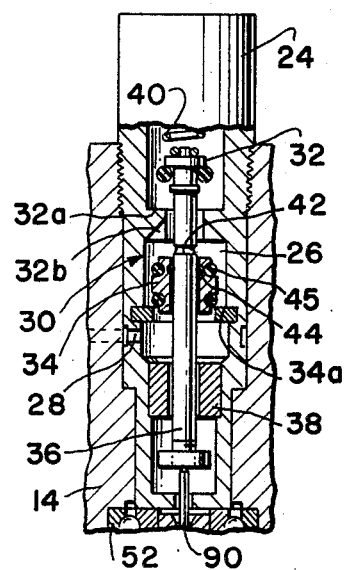

After the aforementioned rearward camming action, as clutch member 66 continues rotating, the teeth of clutch member 66 are forced by spring 80 forwardly into meshing engagement with the teeth of clutch member 68 causing rod 90 to be forced forwardly by spring 40 at the rear end of valve 32. As the valve stem 36 is moved forwardly, valve 34 moves therewith and seats on its valve seat into a closed position to shut off the flow of pressure fluid to the motor stopping operation thereof and of the tool, see FIG. 5.

After stopping of the motor, the operator disengages the working implement of the tool from the work to permit the working implement 58, chuck 56, and the torque sensing means 54 to be forced forwardly by spring 85 at the rear end of threaded member 62. Forward movement of torque sensing means 54 permits valve stem 36 and valve 32 to be moved forwardly by spring 40 located rearwardly of valve 32 and positioned in their original position prior to starting of the tool. As valve stem 36 moves forwardly into its original position, groove 42 is moved into its original position to register with and receive balls 44 so that valve 34 is again held in a yieldable position on valve stem 36. As the tool is removed from the work, the valve stem 36 and valves 32 and 34, as well as the other components of the tool, resume their position shown in FIG. 1.

With this arrangement of the novel and improved control device, the tool is rendered inoperative immediately after the torque resistance of the work reaches a predetermined value, and although the tool is held pressed against the work, the supply of pressure fluid to the motor is automatically shut off.

Although a preferred embodiment of the invention is shown, it will be understood that the invention is not limited thereto, but contemplates other embodiments and variations which utilize the concepts and teachings of this invention.

What is claimed is:
1. A control device for the supply of pressure fluid to a fluid actuated motor in a torque producing tool comprising:
   a motor connected to a source of pressure fluid;
   a normally closed first valve for the supply and shut off of pressure fluid to said motor;
   a normally closed second valve movable with said first valve for the supply and shut off of pressure fluid to said motor;

a torque sensing means connected to said motor to be driven thereby;

a spindle connected to said torque sensing means to be rotated thereby and movable with said torque sensing means;

means to transmit motion from said torque sensing means to each of said valves to open both of said valves when said spindle is moved in one direction, and to close said valves when said spindle and means for transmitting motion is moved in the opposite direction; and means responsive to a predetermined torque on said spindle to cause one of said valves to shut off said flow of pressure fluid to said motor immediately after reaching said predetermined torque and prior to movement of said spindle and means for transmitting motion in said opposite direction.

2. A control device for the supply of pressure fluid to a fluid actuated motor in a torque producing tool comprising:

a casing having a passage for the flow of pressure fluid therethrough;

a motor in said casing receiving pressure fluid from said passage;

a first valve in said passage movable into a closed and open position;

a second valve in said passage positioned downstream of said first valve and movable into a closed and open position simultaneously with said first valve;

a torque sensing means connected to said motor to be driven thereby;

a spindle connected to said torque sensing means to be rotated thereby;

said spindle and said torque sensing means being axially movable;

engaging means between said spindle and said first and second valves for conjoined axial movement of said spindle, said torque sensing means and said valves so that the movement of said spindle in one direction is operative to move said valves into an open position, and the movement of said spindle in an opposite direction is operative to move said valves into a closed position; and means responsive to the sensing of a predetermined torque load by said torque sensing means to move said second valve into a closed position to shut off said supply of pressure fluid to said motor prior to movement of said spindle in said opposite direction and associated movement of said first valve into a closed position.

3. A control device for the supply of pressure fluid to a fluid actuated motor in a torque producing tool comprising:

a casing having a passage for the flow of motive fluid therethrough;

a motor in said casing receiving pressure fluid from said passage;

a first valve in said passage movable in one direction into an open position and movable in the opposite direction into a closed position;

a valve stem on which said valve is rigidly mounted;

a second valve in said passage positioned downstream of said first valve and mounted on said valve stem to move in conjunction therewith into an open and closed position;

a torque sensing means connected to said motor to be rotated thereby and being axially movable;

said torque sensing means being operative to move axially in response to the sensing of a predetermined torque load;

a spindle connected to said torque sensing means to be rotated thereby and reciprocable with said torque sensing means relative to said valves;

a rod to transmit motion from one of said torque sensing means to said valve stem to cause said valves to be reciprocated in conjunction with said torque sensing means and said spindle; and means to cause said second valve to be moved to a closed position by said torque sensing means in response to a predetermined torque load, prior to movement of said spindle and said first valve into a closed position.

4. The control device according to claim 3 wherein said means includes a detent arrangement to releasably hold said second valve on said valve stem in a position to move simultaneously with said first valve into an open and closed position.

References Cited

UNITED STATES PATENTS

| | | | |
|---|---|---|---|
| 3,082,742 | 3/1963 | Vilmerding et al. | 81—52.4 |
| 3,162,250 | 12/1964 | Sindelar | 173—12 |
| 3,242,996 | 3/1966 | Wright et al. | 173—12 X |
| 3,385,377 | 5/1968 | Amtsberg et al. | 173—12 |

ERNEST R. PURSER, Primary Examiner

U.S. Cl. X.R.

91—59